(12) United States Patent
Cox et al.

(10) Patent No.: US 9,586,560 B2
(45) Date of Patent: Mar. 7, 2017

(54) WINDSCREEN WIPER DEVICE

(71) Applicant: Federal-Mogul Corporation, Southfield, MI (US)

(72) Inventors: Dennis E. Cox, Belleville, MI (US); William D. Young, III, Waterford, MI (US)

(73) Assignee: Federal-Mogul Corporation, Southfield, MI (US)

( * ) Notice: Subject to any disclaimer, the term of this patent is extended or adjusted under 35 U.S.C. 154(b) by 336 days.

(21) Appl. No.: 14/290,609

(22) Filed: May 29, 2014

(65) Prior Publication Data

US 2014/0352097 A1    Dec. 4, 2014

Related U.S. Application Data

(60) Provisional application No. 61/828,530, filed on May 29, 2013.

(51) Int. Cl.
*B60S 1/40*    (2006.01)

(52) U.S. Cl.
CPC ........... *B60S 1/4006* (2013.01); *B60S 1/4019* (2013.01); *B60S 2001/4032* (2013.01)

(58) Field of Classification Search
CPC .... B60S 1/4006; B60S 1/4009; B60S 1/4016; B60S 1/4019; B60S 2001/4022; B60S 2001/4025; B60S 2001/4032
(Continued)

(56) References Cited

U.S. PATENT DOCUMENTS

| 4,179,767 A | 12/1979 | Weiler et al. |
| 4,290,164 A | 9/1981 | van den Berg |

(Continued)

FOREIGN PATENT DOCUMENTS

| CA | 1141906 | 11/1978 |
| CA | 1133663 | 10/1982 |

(Continued)

OTHER PUBLICATIONS

Machine translation of description portion of KR 10-0894436, published Apr. 2009.*
(Continued)

*Primary Examiner* — Gary Graham
(74) *Attorney, Agent, or Firm* — Robert L. Stearns; Dickinson Wright, PLLC

(57) ABSTRACT

A windscreen wiper device is provided. The wiper device includes an elongate wiping element made of an elastic material and a support member which operably supports the wiping element. The wiper device further includes an adapter made of one piece for securely and releasably engaging an oscillating wiper arm. The adapter includes a pair of laterally spaced sidewalls that extend longitudinally from a front end to a back end. The adapter further includes a cantilever beam which is positioned between the side walls and extends longitudinally towards the back end. The cantilever beam is pivotal in a vertical direction at a hinge and has a stepped configuration which presents three longitudinally and vertically spaced protrusions which project vertically downwardly for engaging in correspondingly shaped holes in at least three of 9×3, 9×4×23, 9×4×28 and 9×4×33 sized hook-style wiper arms.

13 Claims, 5 Drawing Sheets

(58) Field of Classification Search
USPC .................................................. 15/250.32
See application file for complete search history.

(56) References Cited

U.S. PATENT DOCUMENTS

| | | | |
|---|---|---|---|
| 4,296,521 | A | 10/1981 | Mower |
| 4,327,458 | A | 5/1982 | Maiocco |
| 4,878,263 | A | 11/1989 | Raymond |
| 5,145,274 | A | 9/1992 | Schon |
| 5,168,597 | A | 12/1992 | Schon et al. |
| 5,606,765 | A | 3/1997 | Ding |
| 5,618,124 | A | 4/1997 | Chen |
| 5,746,534 | A | 5/1998 | Hara |
| 5,768,739 | A | 6/1998 | Iso |
| 5,807,016 | A | 9/1998 | Herring et al. |
| D402,254 | S | 12/1998 | Lee |
| D404,354 | S | 1/1999 | Witek et al. |
| 5,885,023 | A | 3/1999 | Witek et al. |
| D418,474 | S | 1/2000 | Witek et al. |
| 6,353,962 | B1 | 3/2002 | Matsumoto et al. |
| 6,539,576 | B2 | 4/2003 | Kim |
| 7,055,207 | B2 | 6/2006 | Coughlin |
| 7,207,082 | B2 | 4/2007 | Lee |
| 8,261,403 | B2 | 9/2012 | Ehde |
| 2002/0174504 | A1 | 11/2002 | Kim |
| 2004/0123414 | A1 | 7/2004 | Lee |
| 2005/0028312 | A1 | 2/2005 | Coughlin |
| 2005/0091793 | A1 | 5/2005 | Huang et al. |
| 2010/0024149 | A1 | 2/2010 | Erdal |
| 2010/0154159 | A1 | 6/2010 | Baque |
| 2012/0260451 | A1 | 10/2012 | Boland |

FOREIGN PATENT DOCUMENTS

| | | | |
|---|---|---|---|
| CA | 2219042 | | 4/2001 |
| CA | 2220462 | | 10/2001 |
| CA | 2590443 | | 10/2006 |
| CA | 2651069 | | 11/2007 |
| EP | 0329515 | | 8/1989 |
| EP | 1346890 | A2 | 9/2003 |
| EP | 1911641 | | 4/2008 |
| KR | 10-0894436 | * | 4/2009 |
| WO | 2012/103944 | | 8/2012 |

OTHER PUBLICATIONS

International Search Report mailed Aug. 14, 2014 (PCT/US2014/040015).

* cited by examiner

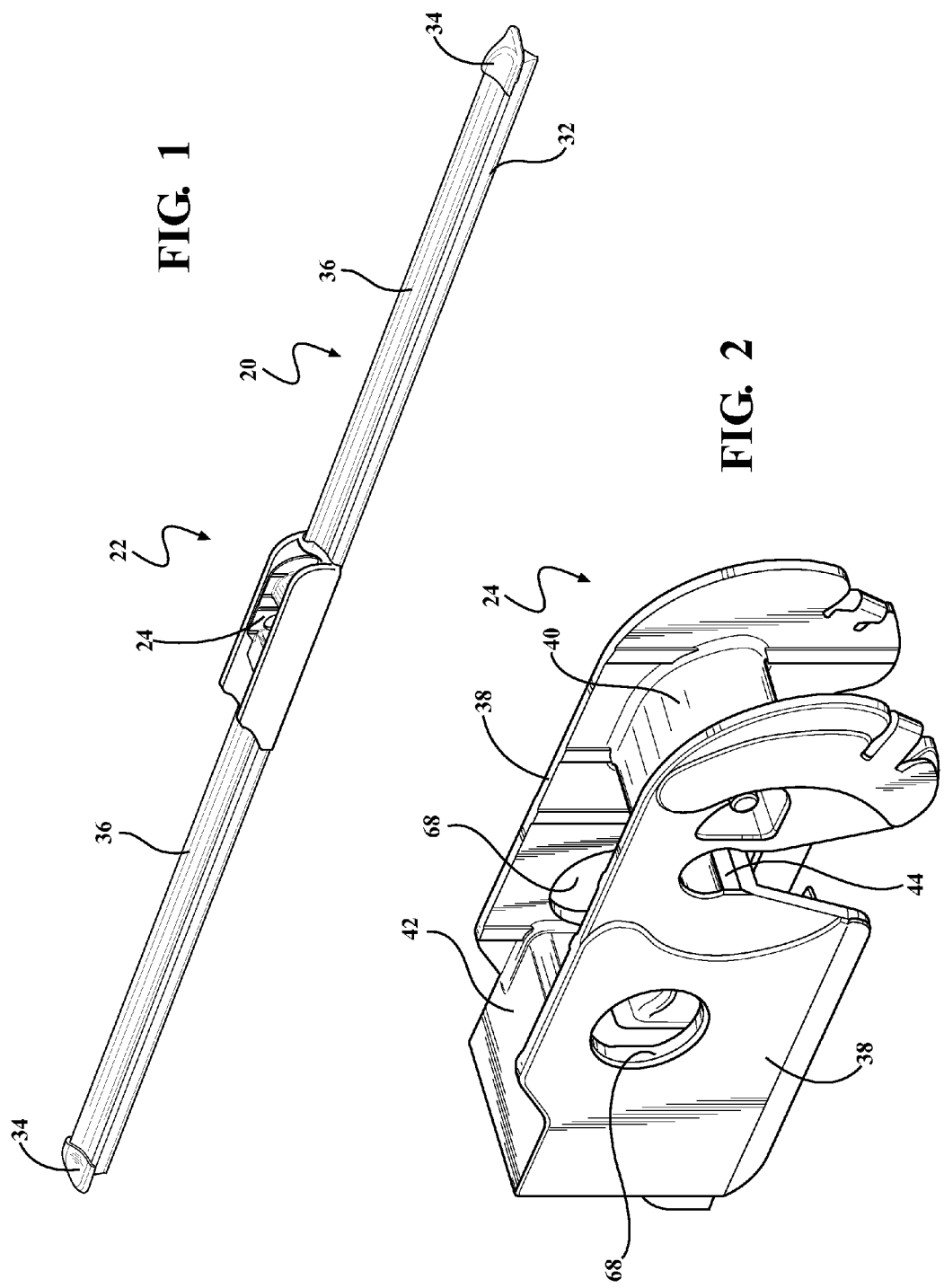

WINDSCREEN WIPER DEVICE

CROSS REFERENCE TO RELATED APPLICATION

This application claims the benefit of application Ser. No. 61/828,530 filed May 29, 2013.

BACKGROUND OF THE INVENTION

1. Field of the Invention

The present invention is related to windscreen wiper devices, or wiper blade assemblies, and more precisely, to connector assemblies for connecting wiper blade assemblies to different types of wiper arms.

2. Related Art

Passenger vehicles may have any one of a range of different styles of oscillating wiper arms including, for example, various sizes of hook-style wiper arms, pin-style wiper arms, bayonet-style wiper arms and rock lock-style wiper arms. Some of the more common types of wiper arms are 9×3, 9×3×23, 9×4×28 and 9×4×33 sized hook-style wiper arms and ¼" sized cylindrical pin-style wiper arms.

Some aftermarket wiper blade assemblies are sold with a connector assembly which is only adapted for attachment with single type and size of wiper arm. Others are packaged and sold with interchangeable parts to allow the wiper blade assembly to be operably attached with two or more of the above-referenced types and sizes of wiper arms. Other aftermarket wiper blades are packaged with a connector assembly that includes a base and four or more adapters which are connectable to the base. Each of the adapters is designed for receiving and operably engaging a different type and size of wiper arm. Still other wiper blade assemblies come with an adapter that is adapted to engage with different sizes of the same type of wiper arm but each size has a unique set of instructions. In other words, the different sizes all connect through different processes, which can be confusing and frustrating for the customer.

SUMMARY OF THE INVENTION

One aspect of the present invention provides for an improved windscreen wiper device with a single adapter which is adapted to releasably and securely connect with at least three differently sized hook-style wiper arms. This allows for manufacturing advantages through economies of scale because it allows for a single type of adapter to be manufactured sold for a wider range of sizes of oscillating wiper arms. Additionally, the improved adapter is configured such that the process of attaching the adapter with the at least three differently sized hook-style wiper arms is basically the same. As such, a single set of instructions can be provided for all three differently sized hook-style wiper arms, and a consumer does not have to identify which size his or her vehicle's hook-style wiper arm is and identify the appropriate instructions for coupling the adapter with the wiper arm as is required for other known adapters.

The windscreen wiper device includes an elongate wiping element made of an elastic material and a support member which operably supports the wiping element. The windscreen wiper device further includes an adapter for securely engaging an oscillating wiper arm. The adapter is made of one piece and includes a pair of laterally spaced sidewalls that extend longitudinally from a front end to a back end. The adapter further includes a cantilever beam which is positioned between the side walls and extends longitudinally towards the back end. The cantilever beam is pivotal in a vertical direction at a hinge and has a stepped configuration which presents three longitudinally and vertically spaced protrusions which project vertically downwardly. The spaced protrusions are adapted to engage in correspondingly shaped holes in at least three differently sized hook-style wiper arms, thereby allowing the adapter to releasably and securely connect with at least three of 9×3, 9×4×23, 9×4×28 and 9×4×33 sized hook-style wiper arms.

According to another aspect of the present invention, the spaced protrusions are adapted to engage in with holes in all four of 9×3, 9×4×23, 9×4×28 and 9×4×33 sized hook-style wiper arms.

According to another aspect of the present invention, the cantilever beam further includes a pin engagement portion on an opposite side from the protrusions for releasably and securely connect with at least one size of pin-style wiper arm. This provides additional versatility to the adapter with little to no additional costs and allows for further manufacturing advantages through economies of scale.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a perspective view of an exemplary embodiment of the windscreen wiper device;

FIG. 2 is a perspective view of an exemplary embodiment of an adapter of the windscreen wiper device of FIG. 1;

DESCRIPTION OF THE ENABLING EMBODIMENT

Figure 3:
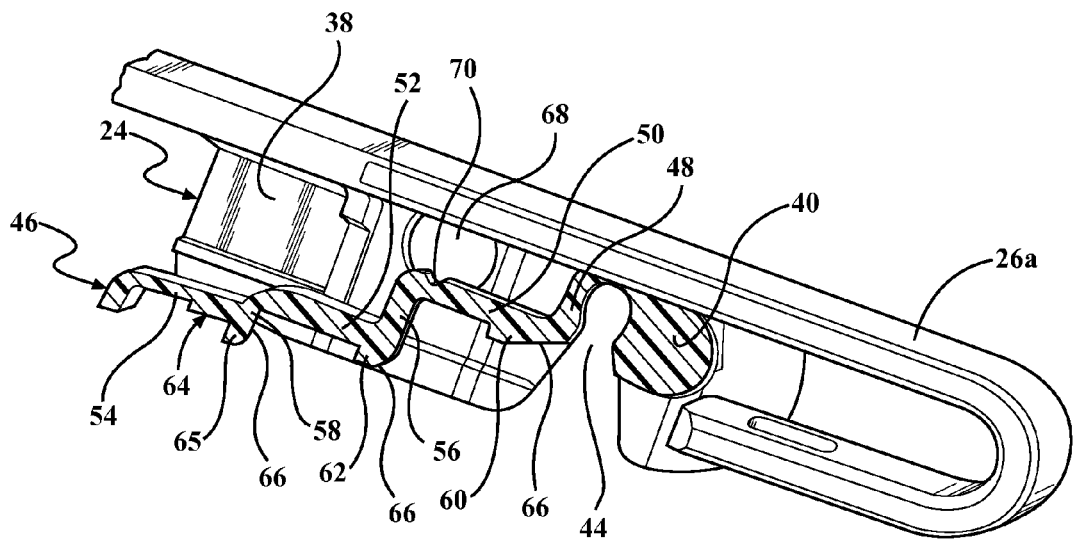
FIG. 3 is a sectional view of the adapter of FIG. 2 and disengaged from a 9×3 sized hook-style wiper arm.
Figure 4:
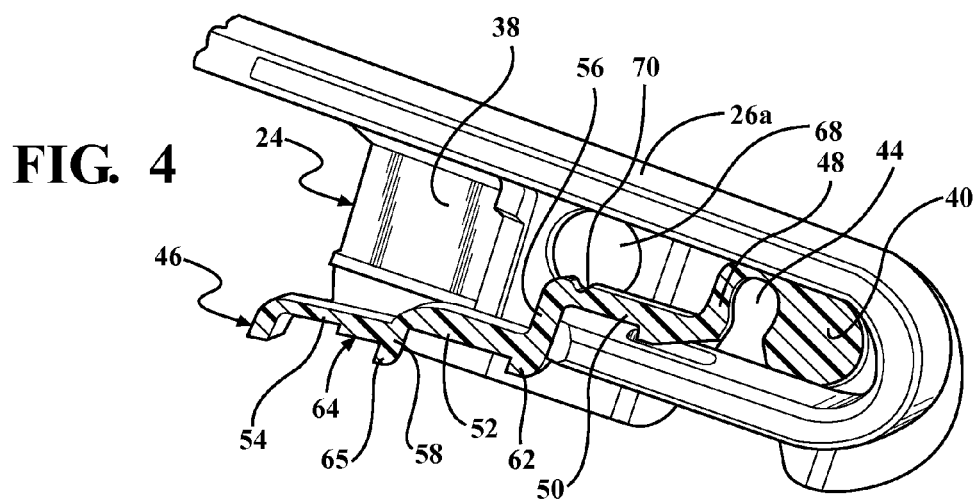
FIG. 4 is a sectional view of the adapter of FIG. 2 engaged with a 9×3 sized hook-style wiper arm.
Figure 5:
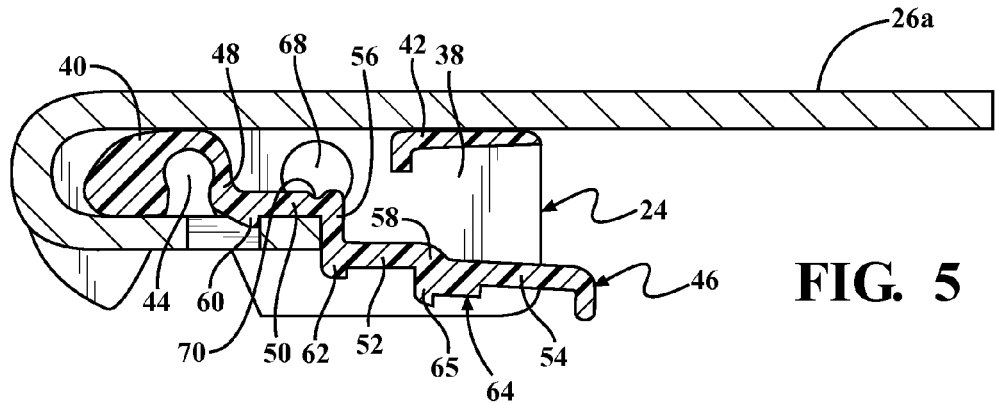
FIG. 5 is a cross-sectional view of the adapter of FIG. 2 engaged with the 9×3 sized hook-style wiper arm.
Figure 6:
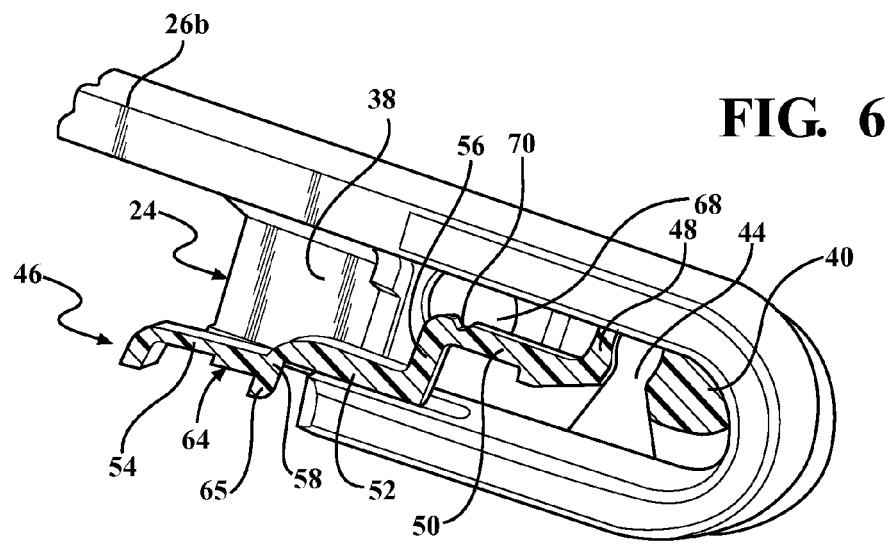
FIG. 6 is a sectional view of the adapter of FIG. 2 engaged with a 9×4×23 sized hook-style wiper arm.
Figure 7:
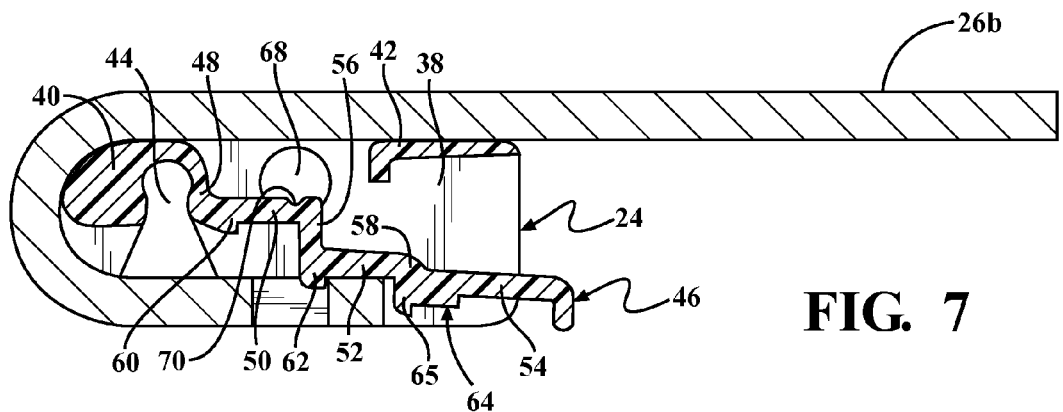
FIG. 7 is a cross-sectional view of the adapter of FIG. 2 engaged with the 9×4×23 sized hook-style wiper arm.

Referring to the Figures, wherein like numerals indicate corresponding parts throughout the several views, an exemplary embodiment of a windscreen wiper device 20 (or a wiper blade assembly) including a connecting device 22 with an adapter 24 is generally shown in FIG. 1. The adapter 24 is configured for attachment to a range of differently sized hook-style oscillating wiper arms 26a, 26b, 26c, 26d (shown in FIGS. 3-9 and 11) and at least one size of pin-style oscillating wiper arm 28 (shown in FIG. 10). This is particularly advantageous for aftermarket wiper devices since a single windscreen wiper device 20 with a single adapter 24, as opposed to multiple adapters, may be packaged and sold to customers whose vehicles have different types and sizes of wiper arms. In addition to manufacturing advantages through economies of scale because only a single adapter 24 has to be produced, such a windscreen wiper device 20 is easier to use for the consumer.

Referring still to FIG. 1, in the exemplary embodiment, the exemplary connecting device 22 also includes a base 30, to which the adapter 24 is rotatably or pivotally joined. This allows for the windscreen wiper device 20 to pivot relative to the wiper arm when installing and removing the windscreen wiper device 20 to and from the vehicle.

The windscreen wiper device 20 of the exemplary embodiment includes an elongated wiping element 32 (also known as a wiper strip or a wiper blade) of an elastic material. The wiping element 32 extends in a longitudinal direction between opposite ends. The windscreen wiper device 20 further includes a support structure for supporting the wiping element 32. The exemplary embodiment of the windscreen wiper device 20 is a beam-style wiper device in support structure is an elongate carrier (not shown) which is pre-curved for biasing the wiping element 32 into a curved shape such that, in use, the longitudinal length of the wiping element 32 seals against a windshield (not shown) of a vehicle for driving rain, snow, ice and other debris away therefrom. The carrier may include, for example, a pair of metal strips which are received in opposing grooves in the wiping element 32 or may include a single metal strip which overlies or is received within a central groove of the wiping element 32. The connecting device 22 is joined to the carrier at approximately a longitudinal midpoint thereof. The exemplary wiper device also includes a pair of end caps 34 which are connected with opposite longitudinal ends of the carrier and a pair of subspoilers 36 which are engaged with the subspoilers 36 and extend longitudinally from the base 30 of the connecting device 22 to the opposite end caps 34 for applying a downforce to improve the seal between the wiping element 32 and the windshield when the vehicle is travelling at speed. However, it should be appreciated that the adapter 24 could find uses in other types of windscreen wiper devices including, for example, conventional style wiper devices, where the support structure includes a plurality of yokes for biasing the wiping element against the windshield, and hybrid style windscreen wiper devices, which include certain aspects of both beam style and conventional style wiper devices.

The adapter 24 of the exemplary embodiment is adapted for securely attaching with four differently sized hook-style wiper arms 26a, 26b, 26c, 26d (9×3, 9×4×23, 9×4×33 and 9×4×28) and one size of pin-style wiper arm 28 (¼" diameter pins). The exemplary adapter 24 is also advantageously adapted to securely connect with the differently sized hook-style wiper arms 26a, 26b, 26c, 26d in a similar manner and from the same direction. As such, regardless of what size of a customer's hook-style wiper arm, he or she only has to follow a single process for attaching the adapter 24 with his or her hook-style wiper arm, i.e., he or she does not have to determine which size of hook-style wiper arm is on his or her vehicle and then follow instructions that are unique to that particular size. This is in contrast to some known adapters which must be rotated by 180 degrees to connect with differently sized wiper arms.

Referring now to FIG. 2, the adapter 24 of the exemplary embodiment includes a pair of side walls 38 which are spaced laterally from one another. The side walls 38 are joined together via a front land 40 which is located adjacent a front end of the adapter 24 and a back land 42 which is located adjacent a back end of the adapter 24. The front and back lands 40, 42 extend laterally between the side walls 38 and are spaced vertically downwardly from the tops of the side walls 38 to present a generally U-shaped channel bounded on three sides by the side walls 38 and the front and back lands 40, 42. The lateral spacing between the side walls 38 is slightly larger than the width of a widest of the differently sized hook-style arms 26, 26b, 26c, 26d to which the adapter 24 is configured for attachment therewith.

The adapter 24 also includes a keyhole-shaped slot 44 which extends to the bottom of the adapter 24 for snapping into connection with a cross-beam (not shown) or pin of the base 30 or support structure of the connecting device 22. The connection between the keyhole-shaped slot 44 of the adapter 24 with a cross-beam on the base 30 establishes a pivoting connection between the adapter 24 and the base 30.

Referring now to the cross-sectional views of FIG. 3-10, the adapter 24 has a single cantilever beam 46 which extends rearwardly from an integral hinge 48 that is located adjacent the keyhole shaped slot 44 towards the back end of the adapter 24 for releasably locking the adapter 24 into engagement with the differently sized hook-style wiper arms 26 and with the pin-style wiper arm 28. The cantilever beam 46 is spaced from both of the side walls 38 such that it may elastically deflect in a vertical direction relative to the front land 40 and to the side walls 38 at the hinge 48. Deflection of the cantilever beam 46 at the integral hinge 48 allows the cantilever beam 46 to releasably engage with holes in the differently sized hook-style wiper arms 26 and to also releasably engage with a groove on the pin-style wiper arm 28.

The cantilever beam 46 extends through a series of bends or curves which are separated longitudinally from one another by a plurality of landings 50, 52, 54. The landings 50, 52, 54 are specifically located for slidably engaging the lower legs of differently sized hook-style wiper arms 26. In the exemplary embodiment, the cantilever beam 46 includes a total of three landings 50, 52, 54, which are hereinafter referred to as a first landing 50, a second landing 52 and a third landing 54. The first and second landings 50, 52 are separated from one another by a first vertical portion 56, and the second and third landings 52, 54 are separated from one another by a second vertical portion 58.

The first landing 50 includes a first protrusion 60 for locking into engagement with a hole in the lower portion of a 9×3 sized hook-style wiper arm 26a. During the process of attaching the 9×3 sized hook-style wiper arm 26a with the adapter 24, the second vertical portion 58 serves as a stopping point for limiting movement of the adapter 24 relative to the wiper arm. When the connector is properly connected with a 9×3 sized hook-style wiper arm 26a, a gap may be present between the front (curved portion) of the hook-style wiper arm 26a and the front land 40. The cantilever beam 46 is shown in a secure connection with a 9×3 sized hook-style wiper arm 26a in FIGS. 4 and 5. Longitudinal movement of the adapter 24 and the hook-style wiper arm 26a relative to one another is restricted in one direction by the second vertical portion 58 and in the other direction the first protrusion 60.

Referring back to FIGS. 6 and 7, the first vertical portion 56 of the cantilever beam 46 extends in a vertical direction between the first and second landings 50, 52 and includes a second protrusion 62 which projects vertically downwardly below the second landing 52 for locking into engagement with a hole in the lower leg of a 9×4×23 sized hook-style wiper arm 26b. The second protrusion 62 is spaced longitudinally behind and vertically below the first protrusion 60. When connected with a 9×4×23 sized hook-style wiper arm 26b, longitudinal movement of the adapter 24 and the wiper arm relative to one another is restricted in one direction by the front land 40 and the second vertical portion 58 and in the other direction by the second protrusion 62.

Figure 8:
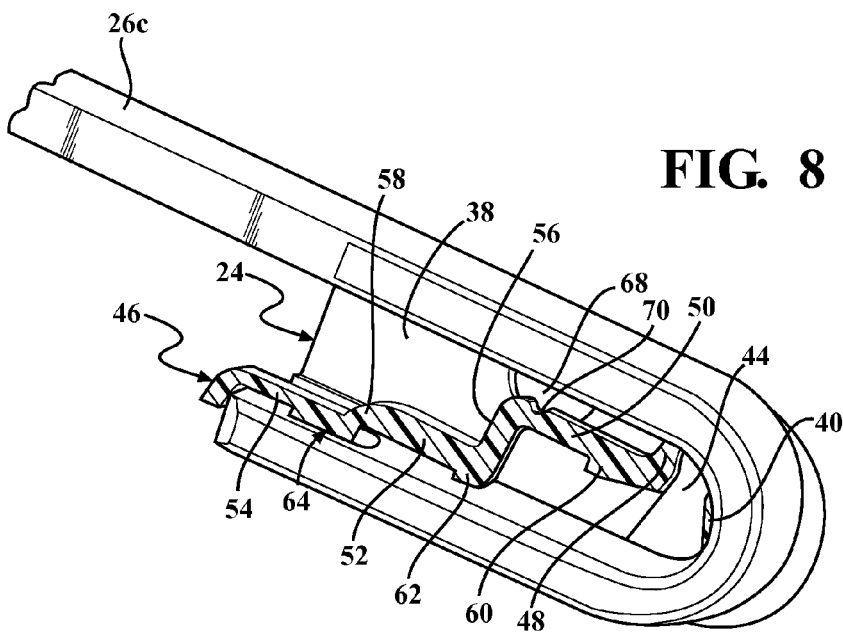
FIG. 8 is a sectional view of the adapter of FIG. 2 engaged with a 9×4×33 sized hook-style wiper arm.
Figure 9:
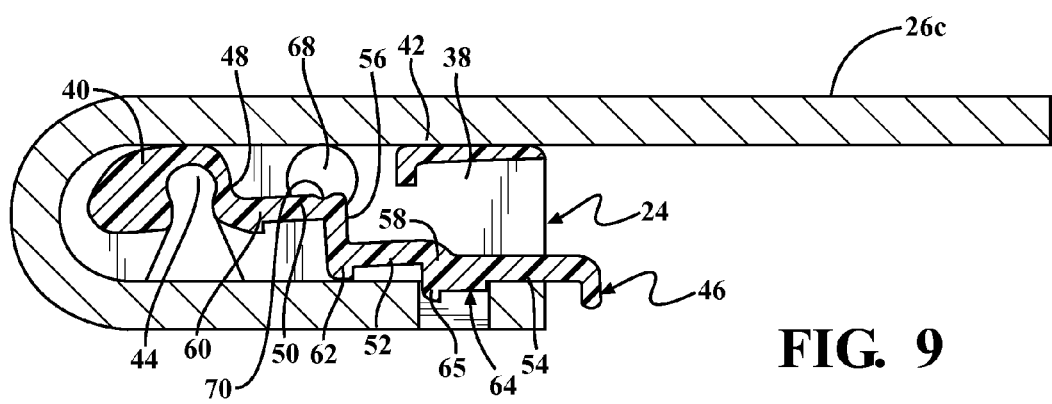
FIG. 9 is a cross-sectional view of the adapter of FIG. 2 engaged with the 9×4×33 sized hook-style wiper arm.
Figure 10:
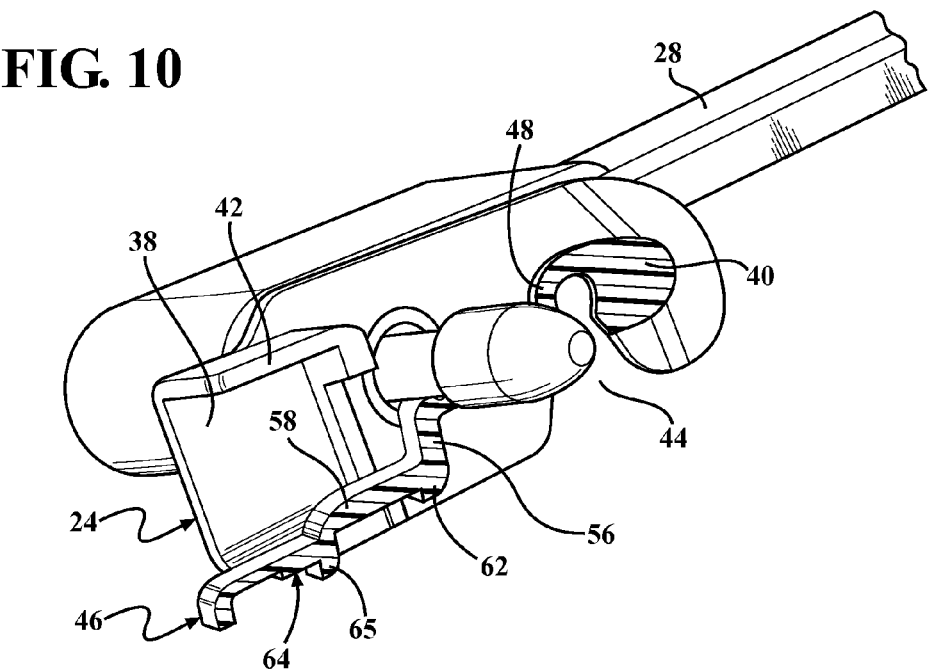
FIG. 10 is a sectional view of the adapter of FIG. 2 engaged with a ¼" sized pin-style wiper arm.

The second vertical portion 58 of the cantilever beam 46 extends at an angle relative to the parallel second and third landings 52, 54. A third protrusion 64 projects vertically downwardly from the second vertical portion 58 and from the third landing 54. The third protrusion 64 is spaced longitudinally behind and vertically below the second protrusion 62. As shown in FIGS. 8 and 9, the third protrusion 64 is adapted to engage with a hole in the lower leg of a 9×4×33 sized hook-style wiper arm 26c. Longitudinal movement of the adapter 24 and the 9×4×33 sized hook-style wiper arm 26c is restricted in both directions by the third protrusion 64.

Figure 11:
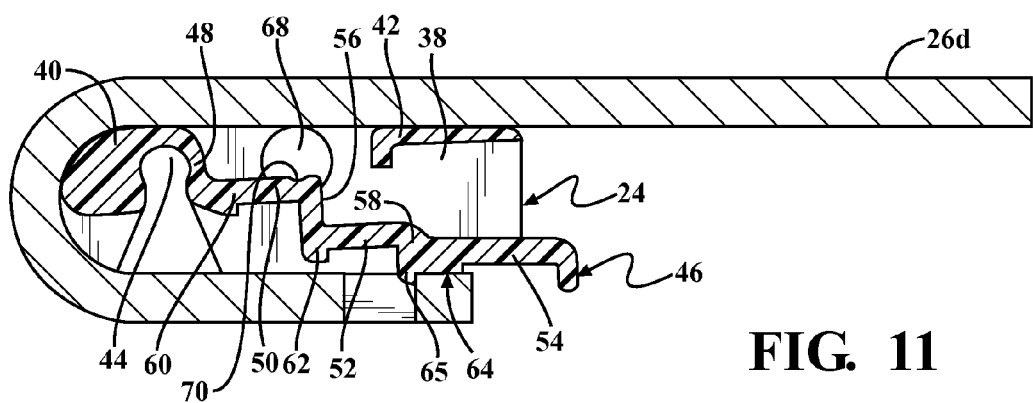
FIG. 11 is a cross-sectional view of the adapter of FIG. 2 engaged with the 9×4×28 sized hook-style wiper arm.

Referring now to FIG. 11, the third protrusion 64 also includes a tab 65 extending downwardly therefrom for engaging with a hole in the lower leg of a 9×4×28 sized hook-style wiper arm 26d. Longitudinal movement of the adapter 24 and the 9×4×28 sized hook-style wiper arm 26d is restricted in one direction by the tab 65 and in the other direction by the front land 40.

As shown in FIG. 3, each of the first, second and third protrusion 60, 62, 64 has a forwardly-facing ramped surfaces 66 for snappingly engaging the holes in the respective hook-style wiper arms 26 to which they are configured for engagement. During the process of attaching the adapter 24 with any of the 9×3, 9×4×23, 9×4×28 and 9×4×33 sized hook-style wiper arms 26, the end of the respective wiper arm contacts one of the ramped surfaces 66, which causes the cantilever beam 46 to deflect resiliently at the hinge 48. Once the wiper arm has travelled a predetermined distance relative to the adapter 24, the cantilever beam 46 automatically snaps downwardly with one of the protrusions 60 engaging into the hole in the lower leg of the wiper arm. This provides an audible signal to a user that a secure connection has been established between the adapter 24 and the wiper arm. This same process allows for connection to any of the three different sizes of hook-style wiper arms 26.

The adapter 24 may be detached from the wiper arm by manually urging the back end of the cantilever beam 46 in an upward direction to disengage the engaged protrusion 60 from the hole in the respective hook-style wiper arm 26. This allows the adapter 24 to be slid longitudinally away from the wiper arm. This same process may be used for detachment of any of the 9×3, 9×4×23, 9×4×28 and 9×4×33 sized hook-style wiper arms 26.

With regard to pin-style wiper arms 28, the side walls 38 have apertures 68 that are aligned with one another, and a top side of the cantilever beam 46 presents a pin engagement feature 70. The pin engagement feature 70 is rounded for engaging against a channel or groove in the pin to securely lock the pin-style wiper arm 28 into engagement with the exemplary adapter 24. For example, the adapter 24 is shown in a locking engagement with a pin-style wiper arm 28 in FIG. 10. In the exemplary embodiment, the cantilever beam 46 is positioned such that its pin engagement feature 70 can only lock into engagement with ¼" diameter pins.

The adapter 24 is preferably made of one unitary piece of a plastic material and is shaped through an injection molding process. However, it should be appreciated that the adapter 24 may be formed of any suitable material and through any suitable forming process.

Obviously, many modifications and variations of the present invention are possible in light of the above teachings and may be practiced otherwise than as specifically described while within the scope of the appended claims.

What is claimed is:

1. A windscreen wiper device, comprising:
an elongate wiping element of an elastic material;
a support member operably supporting said wiping element;
an adapter for securely engaging an oscillating wiper arm;
said adapter presenting a slot for receiving a cross beam to interconnect said adapter with said support member;
said adapter being made of one piece and including a pair of laterally spaced side walls that extend longitudinally from a front end to a back end and including a cantilever beam located between said side walls and extending longitudinally towards said back end, said cantilever beam being pivotal in a vertical direction at a hinge and having a stepped configuration and including three longitudinally and vertically spaced protrusions which project vertically downwardly, and said three spaced protrusions being adapted to engage in correspondingly shaped holes in at least three differently sized hook-style wiper arms for allowing said adapter to releasably and securely connect with at least three of 9×3, 9×4×23, 9×4×28 and 9×4×33 sized hook-style wiper arms; and
wherein one of said protrusions has a pair of walls which both face away from said slot and which are spaced longitudinally and vertically from one another for lockingly engaging openings in differently sized wiper arms.

2. The windscreen wiper device as set forth in claim 1 wherein said at least three protrusions are adapted to releasably and securely connect with all four of 9×3, 9×4×23, 9×4×28 and 9×4×33 sized hook-style wiper arms.

3. The windscreen wiper device as set forth in claim 1 and wherein said side walls of said adapter include openings that are aligned with one another and wherein said cantilever beam further includes a pin engagement feature for engaging with a groove of a pin-style wiper arm.

4. The windscreen wiper device as set forth in claim 3 wherein said pin engagement feature is on an opposite side of said cantilever beam from said protrusions.

5. The windscreen wiper device as set forth in claim 1 wherein said slot is further defined as being a pair of keyhole shaped slots in said side walls of said adapter for receiving and pivotally connecting said adapter with the cross beam.

6. The windscreen wiper device as set forth in claim 5 wherein said hinge of said cantilever beam is located adjacent said keyhole shaped slot.

7. The windscreen wiper device as set forth in claim 1 wherein said cantilever beam includes a first landing and a second landing and a third landing and a first vertical portion and a second vertical portion, said first vertical portion separating said first and second landings, and said second vertical portion separating said second and third landings.

8. The windscreen wiper device as set forth in claim 7 wherein said at least three protrusions includes a first protrusion which projects downwardly from said first landing and a second protrusion which projects downwardly from said first vertical portion and a third protrusion which projects downwardly from said second vertical portion and from said third landing.

9. The windscreen wiper device as set forth in claim 1 wherein each of said protrusions includes a forwardly facing ramped surface for facilitating the pivoting of said cantilever beam during connecting of said adapter with a hook-style wiper arm.

10. The windscreen wiper device as set forth in claim 1 further including a base and wherein said adapter is pivotally coupleable with said base.

11. The windscreen wiper device as set forth in claim 1 wherein said adapter is made of a plastic material.

12. The windscreen wiper device as set forth in claim 1 wherein said adapter further includes a front land and a back land.

13. The windscreen wiper device as set forth in claim 12 wherein said side walls extend above said front and back lands to present a channel.

* * * * *